Dec. 14, 1965   J. L. HAYNES   3,222,856
COMBINATION RAKE AND CART
Filed Nov. 29, 1963
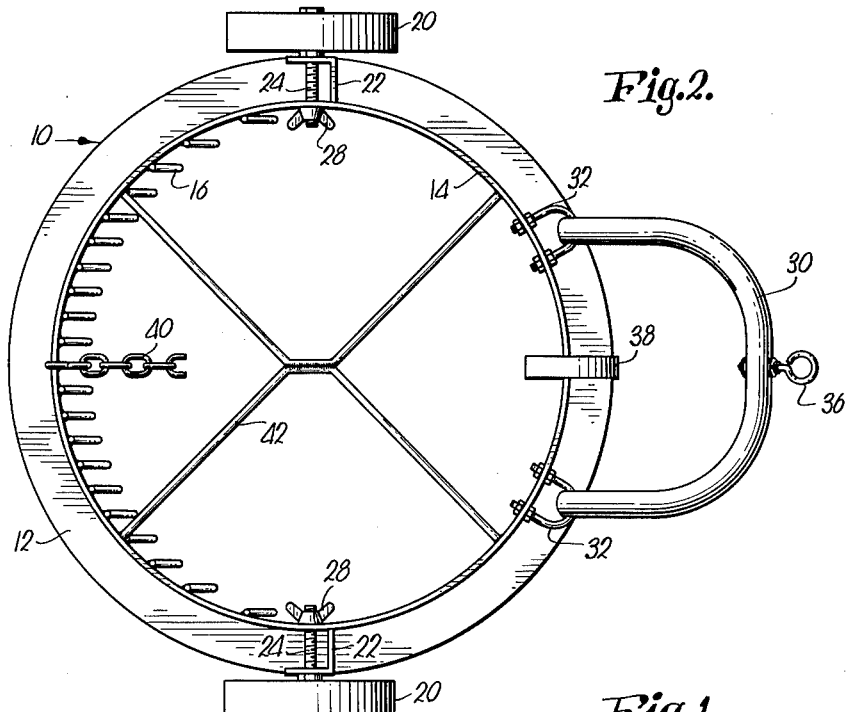
Fig.2.
Fig.1.
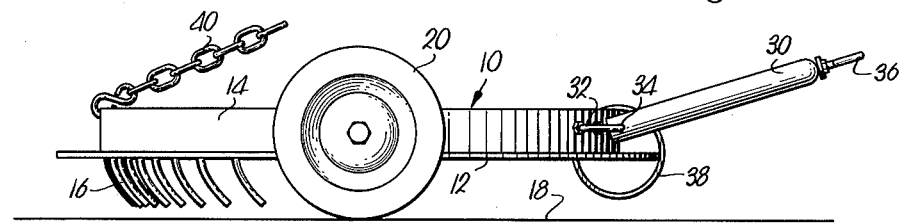
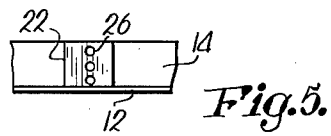
Fig.5.
Fig.3.
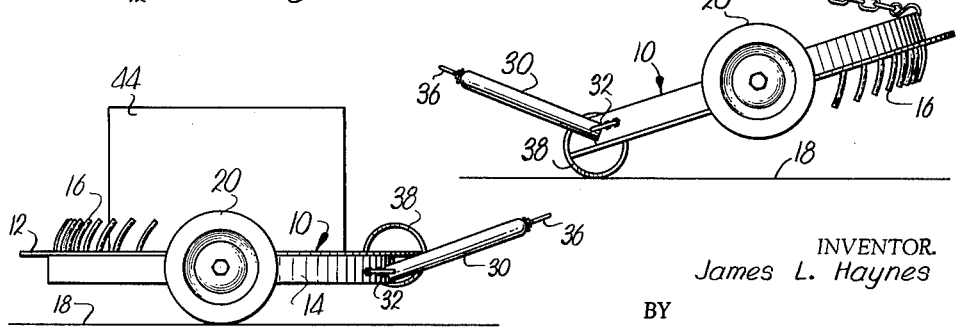
Fig.4.
INVENTOR.
James L. Haynes
BY
Hovey, Schmidt, Johnson & Hovey.
ATTORNEYS.

United States Patent Office 3,222,856
Patented Dec. 14, 1965

3,222,856
COMBINATION RAKE AND CART
James L. Haynes, Kansas City, Mo.
(609 S. Grove, Kewanee, Ill. 61443)
Filed Nov. 29, 1963, Ser. No. 326,708
3 Claims. (Cl. 56—384)

This invention relates to a combination rake and cart for use especially with riding lawn mowers or small tractors and adapted to perform a number of important operations in lawn and garden care.

The lawn mower has undergone extensive refinements in recent years. A mower with a motor-powered blade was the first advancement over the old manually-powered mower, subsequent improvements including completely power-driven mowers where the operator thereof merely steered the unit and, finally, the riding mower in the form of, or connected to, a small tractor. Manifestly, each improvement decreased the time required to mow a lawn or other plot.

Even with the coming of such improved mowing devices however, the problem of collecting and removing the cut grass after the mowing operation still exists. Regardless of the speed with which the mowing operation may be performed, it is evident that considerable time is still involved in giving the lawn a finished appearance if the cut grass and other debris must be removed by hand. Furthermore, raking of yards to remove leaves, dead grass, weeds, trash and other debris is a time-consuming and laborious task when done by hand. Similiarly, use of hand-operated implements in preparing gardens for planting and other phases of cultivation of the soil is an extensive job limiting the amount of ground which may be properly prepared and maintained by one person.

It is another important object of the invention to provide a rake unit adapted to be mounted behind a tractor or riding mower and which is utilizable to either collect leaves or grass clippings on a lawn surface, or to suitably till the soil in a garden without modification of the rake unit being required in any way.

Another important object of the invention is to provide a rake which is especially adapted to be mounted behind a riding lawn mower for collecting the cut grass clippings simultaneously with the mowing operation and constructed in a manner to permit collection of the grass cutting in spaced piles which may be easily picked up and transported to a final storage area.

It is another important object of this invention to provide a rake for collecting grass clippings, leaves or other debris on the surface of a lawn wherein the tines of the rake are mounted on a curved frame member to cause the clippings and leaves to be trapped and maintained in front of the rake during forward motion thereof.

Still another important object of the instant invention is to provide a curved rake as aforesaid which may be operated in a novel manner to accumulate grass or leaves in piles or stacks during use of the rake to make subsequent pickup of the grass cuttings or leaves very quick and easy. In this respect it is an object of this invention to provide a curved rake as described which is selectively operable by the operator so that manual dumping of accumulated grass or leaves into piles or stacks may be accomplished when desired and with minimum operator attention.

Still a further object of this invention is to provide a cut grass and leaf-collecting device that also serves as a cart for a waste container for the collected material and thereby making it much easier to transport the grass cuttings and leaves to a storage area at any time.

Yet another object of the instant invention is to provide a curved, grass-collecting rake as set forth above having a variable raking depth to adapt the same to a variety of ground conditions in yards, as well as gardens or the like.

Other objects will become apparent as the detailed description proceeds.

In the drawing:
FIGURE 1 is a side elevational view of the apparatus;
FIG. 2 is a top plan view thereof;
FIG. 3 is a side elevational view showing the apparatus in a tilted position during dumping of the collected grass;
FIG. 4 is a side elevational view showing the instant invention operated as a cart for carrying a trash container; and
FIG. 5 is a fragmentary, detailed view illustrating the variable rake depth feature.

The numeral 10 denotes a circular, transversely L-shaped frame having a normally horizontal, annular flange 12, and a vertically extending, circular wall or hoop 14 as integral parts thereof. A row of tines or teeth 16 depends from the rearward, semicircular portion of frame 10. Tines 16 may be 3/16" diameter steel rods welded to the inner face of hoop 14. For raking lawns or the like, best results are obtained by locating the individual tines in dispositions such that the space between planes through adjacent tines in a direction parallel to line of draft of the rake is about one inch. It also is important to note that tines 16 are generally parallel and curve forwardly as the ground 18 is approached.

A pair of diametrically opposed wheels 20 are mounted on frame 10 by angle brackets 22 rigid with the upper surface of flange 12 and the outer face of hoop 14. Stub axles 24 for wheels 20 extend through any one of three openings 26 in bracket 22 and into corresponding openings (not shown) in hoop 14. The inner ends of axles 24 receive wing nuts 28, tightening of the latter serving to releasably maintain the wheels on the frame. (One of the brackets 22 with its openings 26 therein is clearly illustrated in FIG. 5.)

A hitch 30 in the form of a U-shaped pipe is swingably mounted on the forward, semicircular portion of hoop 14 by a pair of U-bolts 32 which extend through holes 34 in corresponding ends of the hitch. Holes 34 have aligned axes which are perpendicular to the line of draft of the device. A rotatable eyebolt 36 is centrally disposed on hitch 30 and serves as a means for connecting the hitch to a motor-driven tractor or mower unit.

A circular skid or safety strap 38 is welded to frame 10 intermediate U-bolts 32 and in alignment with eyebolt 36. It may be seen in FIG. 1 that the major portion of skid 38 projects downwardly from frame 10, but that the lower most part of the skid is normally in spaced relationship from ground 18. In opposing relationship to skid 38, a dumping chain 40 is attached to hoop 14 of frame 10 and, as illustrated in FIG. 3, pulling on the chain tilts the assembly as skid 38 moves into sliding engagement with ground 18 and thereby shifting tines 16 away from the ground.

An additional feature of the instant invention is shown in FIG. 2. An X-shaped rack 42 in the form of four intersecting, substantially radially extending rods is mounted on frame 10 within the central, open portion thereof. FIGURE 4 illustrates the way in which rack 42 may be used to support a trash container 44, especially when the assembly is turned upside down. However, it is to be appreciated that rack 42 also is operable to support a container 44 thereon when the rake is in the normal disposition of the same as shown in FIG. 1.

In the operation of the instant rake structure, eye-bolt 36 is coupled with the drawbar or other frame structure of a riding mower or tractor and the rake is thus pulled behind the mower during operation thereof. The normal operative disposition of the implement is illustrated in FIG. 1 where it may be appreciated that the tines 16 are disposed in raking relationship to the ground 18.

Openings 26 provide a convenient means for adjusting tines 16, FIG. 1 illustrating the vertical disposition of the tines when each axle 24 is received by the corresponding center opening 26. It is contemplated that the three openings 26 in each bracket 22 be spaced such that the uppermost opening in each bracket will cause the ends of the tines to dig into the ground approximately 3/16" while the center and lowermost openings will space the ends of the tines corresponding distances above the soil. In this manner, the uppermost setting may be used to eliminate chickweed or similar undesirable growths, to prepare the soil for seeding, to break up the ground in a plowed garden, or to rake the soil after seeding. The middle setting should allow the tines to rake deeply into the grass to collect any loose debris present therein. The lower setting would be employed to rake along the top of the grass.

As the implement continues to collect grass clippings, leaves or other material on the surface of the yard, it is evident that such debris will accumulate ahead of the tines. Manifestly, the central, open portion of frame 10 eventually becomes filled and making it desirable to dump or expel the cut grass or leaves from the implement. At this time, manual actuation of chain 40 by the operator of the mower or tractor tilts the implement in the manner as shown in FIG. 3 to dump the accumulated debris in a pile or stack on the lawn and as the rake frame rides on skid 38. After the dumping action, release of chain 40 returns the implement to its normal, operative disposition resting on wheels 20. It should be pointed out at this juncture that the skid 38 also serves the extremely important function of preventing the forward edge of frame 12 from digging into the turf or ground when the rake is operated over rough or uneven terrain.

It should be appreciated that the other end of chain 40 (not shown in the drawing) may be conveniently hooked to the seat of the riding mower or tractor so that the operator may merely reach to the rear and pull the chain at desired intervals. The ability of the operator of the rake to tilt the implement at any desired time is also important in tilling of the plowed soil in a garden or the like because debris from the ground which tends to collect in or on the rake can be easily displaced from the implement without it being necessary for the operator to leave his seat.

Once the mowing operation is completed, the implement may be turned upside down if desired and as illustrated in FIG. 4 so that trash container 44 may be placed on rack 42. Container 44 usually takes the form of a bushel basket or the like into which the various piles of accumulated grass clippings or leaves may be placed. The implement thus serves as a cart for the trash container which is drawn by the mower or tractor over the lawn from one pile of grass clippings or leaves to the next pile. In this manner, the necessity for manually carrying the container or basket from pile to pile during pickup of the stacks of accumulated material is eliminated. The operator may also position basket 44 on rack 42.

It should further be noted that the swinging action of hitch 30 not only allows the implement to accommodate a variety of garden tractors or riding mowers having different hitching heights, but also, in conjunction with the rotatable eyebolt 36, permits the change-over from raking to carting to be effected without uncoupling the hitch. Furthermore, the hitch assembly, because of its pivotal coupling to the rake frame, makes it very easy for the operator of the implement to tilt the unit as shown in FIG. 3. However, the coupling of hitch 30 with frame 10 is sufficiently rigid to allow reverse or rearward movement of the implement by the tractor or mower.

It should be understood that the instant invention is adapted for a variety of applications such as conditioning the soil and eliminating weeds as aforesaid, including leaf raking of the lawn to collect trash or other debris scattered thereon. Although the invention is not limited to any certain size, it has been found that an inside diameter of frame 10 of approximately 21", and a wheel diameter of approximately 7" forms a practical unit of convenient size.

Having thus described the invention, what is claimed as new and desired to be secured by Letters Patent is:

1. A yard implement comprising:

a generally circular, normally substantially horizontal frame;

a pair of diametrically opposed wheels on the frame having axes of rotation extending substantially radially thereof, the wheels being adapted for supporting the frame in spaced relationship from the ground during movement thereof;

a plurality of spaced tines on the semicircular portion of the frame rearwardly of the wheels and projecting toward the ground, whereby forward movement of the implement collects cut grass and leaves or the like in front of the tines; and means coupled with said rearward portion for raising the latter to move the tines away from the ground, there being structure centrally disposed on the semicircular portion of the frame forwardly of the wheels for engaging the ground to support the frame during movement thereof and actuation of said means, whereby the cut grass and leaves or the like collected by the tines may be dumped when desired.

2. The invention of claim 1, wherein said structure comprises a skid for slidably engaging the ground.

3. The invention of claim 1, wherein is provided a hitch adapted for coupling with a tractor, said hitch being attached to said forward portion of the frame for swinging movement, about an axis orthogonal to the path of travel of the implement, to a disposition accommodating coupling thereof with the tractor.

References Cited by the Examiner
UNITED STATES PATENTS

| | | | |
|---|---|---|---|
| 658,647 | 9/1900 | Hughes | 56—384 |
| 2,910,128 | 10/1959 | Giles | 172—34 |

ABRAHAM G. STONE, *Primary Examiner.*

ANTONIO F. GUIDA, *Examiner.*